United States Patent
Joyce et al.

(10) Patent No.: US 7,653,130 B2
(45) Date of Patent: Jan. 26, 2010

(54) METHOD AND APPARATUS FOR BIT RATE REDUCTION IN VIDEO TELEPHONY

(75) Inventors: Gerald R. Joyce, Newton, MA (US); Timothy M. Burke, Norton, MA (US); David R. Flanagan, Framingham, MA (US)

(73) Assignee: General Instrument Corporation, Horsham, PA (US)

( * ) Notice: Subject to any disclaimer, the term of this patent is extended or adjusted under 35 U.S.C. 154(b) by 125 days.

(21) Appl. No.: 11/616,347

(22) Filed: Dec. 27, 2006

(65) Prior Publication Data

US 2008/0159385 A1    Jul. 3, 2008

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.07
(58) Field of Classification Search ........................ 375/240.02–240.25; 382/236, 238, 251, 253
See application file for complete search history.

(56) References Cited

U.S. PATENT DOCUMENTS

| 6,778,605 | B1* | 8/2004 | Hamanaka | 375/240.16 |
| 7,095,786 | B1* | 8/2006 | Schonfeld et al. | 375/240.16 |
| 7,180,945 | B2* | 2/2007 | Furukawa et al. | 375/240.16 |
| 2001/0004739 | A1* | 6/2001 | Sekiguchi et al. | 707/100 |
| 2005/0018772 | A1* | 1/2005 | Sung et al. | 375/240.16 |

* cited by examiner

*Primary Examiner*—Nhon T Diep
(74) *Attorney, Agent, or Firm*—Stewart M. Wiener

(57) ABSTRACT

Method and apparatus for encoding video is described. In one example, average of motion vectors for each of a plurality of blocks is maintained over a threshold number of inter-coded frames in the video. The running average of motion vectors for each of the plurality of blocks is compared to a threshold value. Each of the plurality of blocks the running average of which does not satisfy the threshold value is encoded using a first quantization parameter. Each of the plurality of blocks the running average of which satisfies the threshold value is encoded using a second quantization parameter. The second quantization parameter results in a coarser quantization of transformed coefficients than the first quantization parameter.

20 Claims, 3 Drawing Sheets

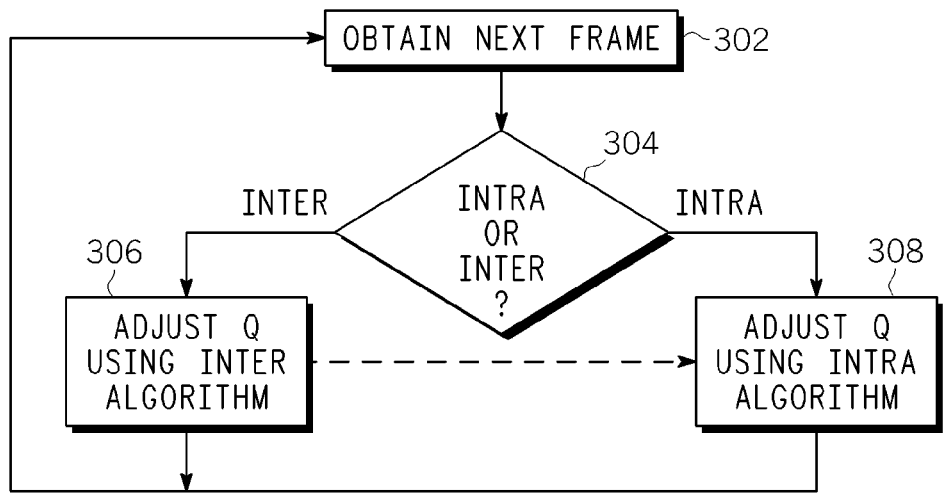
FIG. 3
FIG. 4
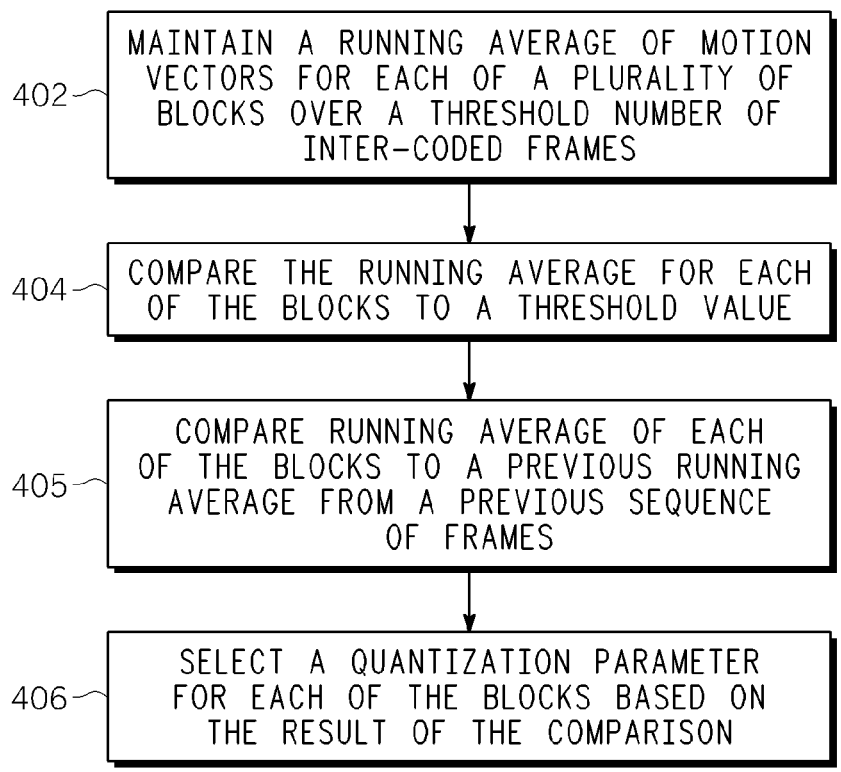

US 7,653,130 B2

METHOD AND APPARATUS FOR BIT RATE REDUCTION IN VIDEO TELEPHONY

FIELD OF THE INVENTION

The present invention relates generally to video encoding, and more particularly relates to a method and apparatus for bit rate reduction in video telephony.

BACKGROUND OF THE INVENTION

Video telephony is thought to be a promising service offering, with many telecommunications and cable companies sponsoring trials. The video streams in video telephony communications are carried over internet protocol (IP) networks. In order to conserve bandwidth, the video data is compressed using efficient video coding standards, such as the International Telecommunication Union (ITU-T) H.264 standards (also referred to as MPEG-4 Part 10 or Advanced Video Coding (AVC)). H.264 exhibits a combination of new techniques and increased degrees of freedom compared to those used in existing compression algorithms, such as H.263, MPEG-2, and MPEG-4 (simple profile). Among the new techniques defined in H.264 are 4×4 pixel macroblocks, Integer Transform to replace the Discrete Cosine Transform, multi-frame prediction, context adaptive variable length coding (CAVLC), SI/SP frames, and context-adaptive binary arithmetic coding (CABAC). The increased degrees of freedom come about by allowing multiple reference frames for prediction and many more tessellations of a 16×16 pixel macroblock.

Video telephony streams are encoded at a lower resolution than entertainment video, but such streams still consume significant bandwidth. Entertainment video often uses the Common Intermediate Format (CIF) with resolution of 352× 288 pixels. Video telephony typically employs quarter CIF (QCIF) resolution of 176×144 pixels, for example. QCIF requires approximately 300 kbps for 30 frames per second. If video telephony becomes popular, with many simultaneous users, then 300 kbps would be a high amount of bandwidth for each user. Therefore, a need exists for a cost-effective method and apparatus for bit-rate reduction in video telephony systems.

SUMMARY OF THE INVENTION

Method and apparatus for encoding video is described. In one embodiment, average of motion vectors for each of a plurality of blocks is maintained over a threshold number of inter-coded frames in the video. The running average of motion vectors for each of the plurality of blocks is compared to a threshold value. Each of the plurality of blocks the running average of which does not satisfy the threshold value is encoded using a first quantization parameter. Each of the plurality of blocks the running average of which satisfies the threshold value is encoded using a second quantization parameter. The second quantization parameter results in a coarser quantization of transformed coefficients than the first quantization parameter. The coarser quantization is applied to both inter-coding (of B and P frames) and intra-coding (of I frames).

BRIEF DESCRIPTION OF THE DRAWINGS

The teaching of the present invention can be readily understood by considering the following detailed description in conjunction with the accompanying drawings, in which:

FIG. 3 is a flow diagram depicting an exemplary embodiment of a method of adjusting a quantization parameter during video encoding in accordance with one or more aspects of the invention;

FIG. 4 is a flow diagram depicting an exemplary embodiment of a method for encoding inter-coded video frames in accordance with one or more aspects of the invention;

DETAILED DESCRIPTION

Figure 1:
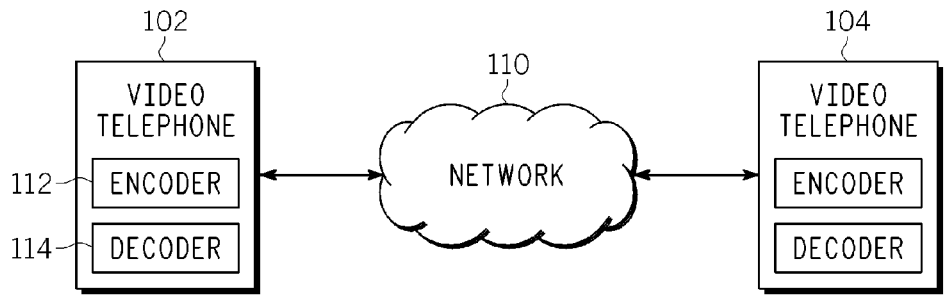
FIG. 1 is a block diagram depicting a general architectural overview of a video telephony network.

FIG. 1 is a block diagram depicting a general architectural overview of a video telephony network 100. The network 100 includes a video telephone 102 and a video telephone 104 connected by an internet protocol (IP) network 110. The video telephone 102 and the video telephone 104 may be any type of communication device capable of transmitting voice and video data via a wired or wireless connection to the IP network 110. Each of the video telephones 102 and 104 includes a video encoder 112 and a video decoder 114. The video encoder 112 is configured to encode input video from a video capture device (not shown) for transmission over the network 110. The video decoder 114 is configured to decode a coded video stream produced by the video encoder 112. Although only two video telephones are illustrated in FIG. 1, those skilled in the art will recognize that any number of video telephones may be coupled to the network 110.

Figure 2:
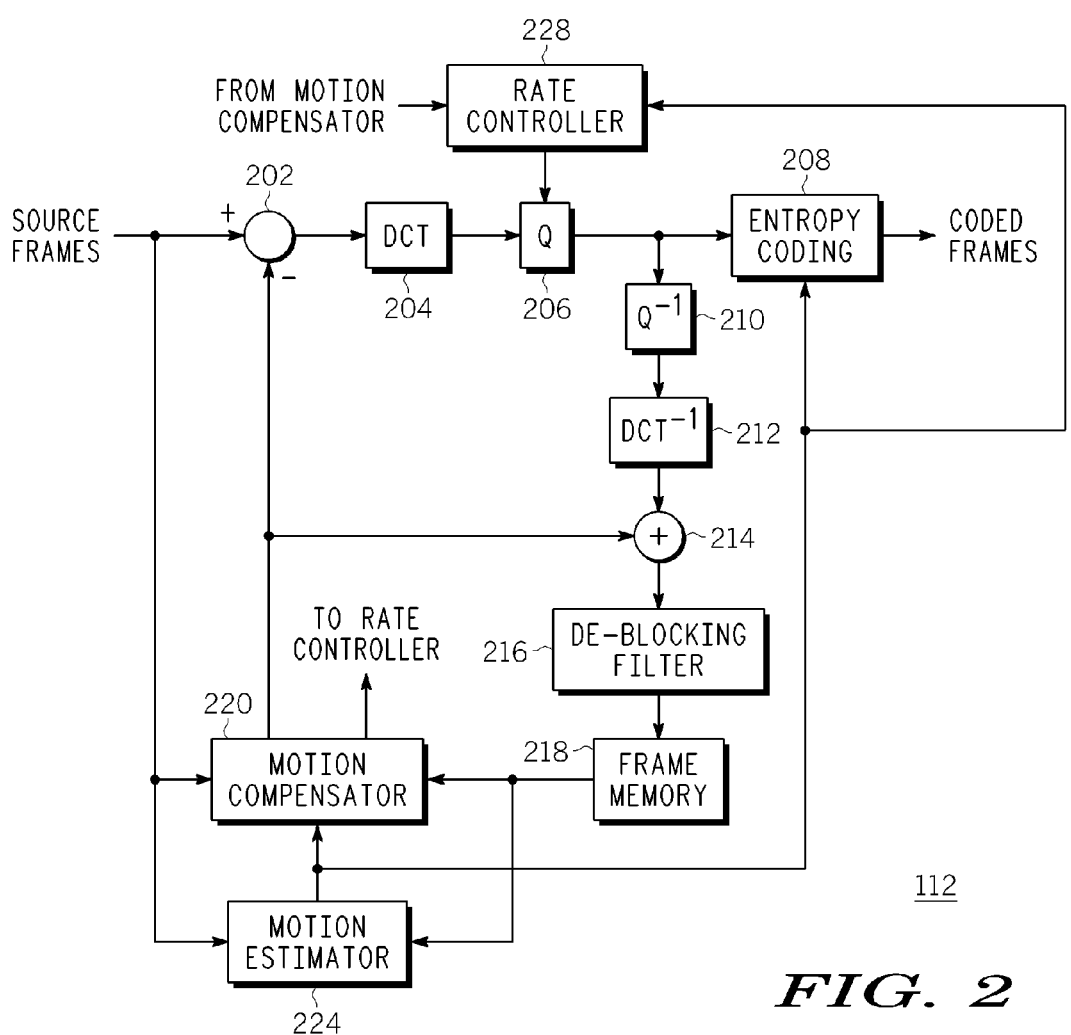
FIG. 2 is a block diagram depicting an exemplary embodiment of a video encoder.

FIG. 2 is a block diagram depicting an exemplary embodiment of the video encoder 112. In one embodiment, the video encoder 112 is compliant with the H.264 standard. The video encoder 112 includes a subtractor 202, a discrete cosine transform (DCT) module 204, a quantizer 206, an entropy coder 208, an inverse quantizer 210, an inverse DCT module 212, a summer 214, a deblocking filter 216, a frame memory 218, a motion compensator 220, a motion estimator 224, and a rate controller 228.

The video encoder 112 receives a sequence of source frames. Each of the source frames is divided into regions referred to herein as blocks. In H.264, there are seven possible block sizes—16×16, 16×8, 8×16, 8×8, 8×4, 4×8, and 4×4 (also referred to as tessellations or partitions). A 16×16 pixel block is commonly referred to as a macroblock. All block sizes are actually tessellations or partitions of a macroblock. Thus, a 16×16 pixel macroblock (MB) can be tessellated into: (A) one 16×16 macroblock region; (B) two 16×8 partitions; (C) two 8×16 partitions; and (D) four 8×8 partitions. Furthermore, each of the 8×8 partitions can be decomposed into: (a) one 8×8 partition; (b) two 8×4 partitions; (c) two 4×8 partitions; and (d) four 4×4 partitions. Furthermore, a frame can be divided into "slices" that include distinct blocks in a source frame.

The subtractor 202 receives a source frame from the input sequence and a predicted frame from the motion compensator 220, e.g., for the INTER coding mode. The subtractor 202 computes a difference between the source frame and the predicted frame, which is provided to the DCT module 204. The motion compensator 220 operates in two modes, INTER and INTRA. In INTER mode, the predicted frame is generated from previously encoded frames and motion estimation data from the motion estimator 224. In INTRA mode, the prediction is not made from previous frames, but with respect to material in the current frame. The algorithm used to decide between INTRA and INTER modes is well known in the art.

The DCT module 204 transforms the difference signal from the pixel domain to the frequency domain using a DCT algorithm to produce a set of coefficients. It should be noted that the present invention is not limited to the use of the DCT module, e.g., some encoders may use an Integer transform and the like. The quantizer 206 quantizes the DCT coefficients. The quantizer 206 quantizes the coefficients in accordance with a quantization parameter provided by the rate controller 228. In H.264, the quantization parameter is selected from 52 possible values. These values are arranged so that an increase of one in the quantization parameter results in an increase of quantization step size by approximately 12% (i.e., an increase of 6 results in an increase of step size by exactly a factor of 2). Notably, an increase in step size of approximately 12% also results in an approximate 12% reduction in bit rate. The rate controller 228 provides the quantization parameter in accordance with motion estimation information from the motion estimator 224, as described below. Notably, slices in the source frame can be encoded using difference quantization parameters. The entropy coder 208 codes the quantized DCT coefficients to produce a coded frame.

The inverse quantizer 210 performs the inverse operation of the quantizer 206 to recover the DCT coefficients. The inverse DCT module 212 performs the inverse operation of the DCT module 204 to produce an estimated difference signal. The estimated difference signal is added to the predicted frame by the summer 214 to produce an estimated frame, which is coupled to the deblocking filter 216. The deblocking filter deblocks the estimated frame and stores the estimated frame in the frame memory 218. The motion compensator 220 and the motion estimator 224 are coupled to the frame memory 218 and are configured to obtain one or more previously estimated frames (previously coded frames).

The motion estimator 224 also receives the source frame. Motion estimation is the process of estimating motion of a current frame in the source video from previously coded frame(s). The motion estimator 224 performs a motion estimation algorithm using the source frame and a previous estimated frame (i.e., reference frame) to produce motion estimation data. The motion estimation data includes motion vectors and minimum sum of absolute differences (SADs) for the blocks of the source frame. There are 259 possible tessellations of a single macroblock. Motion vectors can be unique for each partition of a macroblock and can point to different reference frames. The motion estimator 224 identifies the optimal manner in which 16×16 macroblocks can be broken down into smaller blocks in order to maximize compression efficiency. This breaking down of the macroblock into a specific pattern of partitions is referred to as "mode selection" or "mode decision."

The motion estimation data is provided to the entropy coder 208 and the motion compensator 220. The entropy coder 208 codes the motion estimation data to produce coded motion data. The motion compensator 220 performs a motion compensation algorithm using either an INTER or an INTRA mode and couples a predicted frame to the subtractor 202. In INTER mode, a previous estimated frame and the motion estimation data is used to produce the predicted frame. In INTRA mode, motion compensation is based on material in the current frame itself to produce the predicted frame. Motion estimation and motion compensation algorithms are well known in the art.

In one embodiment of the invention, the video encoder 112 is configured to divide frames of video into an important slice and a less important slice. The important slice includes regions of the video exhibiting motion. In video telephony, the important slice will contain a speaker's face and body. The less important slice includes regions of the video that are static. In video telephony, the less important slice will contain the static background with respect to the speaker. That is, in video telephony, unlike in ordinary video, the user's focus in on the face of the other person. It is the image quality of the face of the other person that is important. The background is less important. The image quality of the background can be allowed to degrade if the high image quality of the face is maintained. Accordingly, an important slice is encoded using a finer quantization parameter than a less important slice. As such, the less important slice will be encoded at a lower bit rate than the important slice. In other words, bandwidth is reduced for the less important slice.

The rate controller 228 is configured to adjust the quantization parameter to create the important slice and the less important slice. For inter-coded frames (e.g., P and B frames), the rate controller 228 dynamically adjusts the quantization parameter using motion information from the motion estimator 224. For intra-coded frames (I-frames), the rate controller 228 dynamically adjusts the quantization parameter using information from the motion compensator 220. It should be noted that it is possible for the rate controller 228 to use the same motion information from the motion estimator 224 to adjust the quantization parameter for the intra-coded I frames as further discussed below with reference to FIG. 6.

FIG. 3 is a flow diagram depicting an exemplary embodiment of a method 300 of adjusting a quantization parameter during video encoding in accordance with one or more aspects of the invention. The method 300 is performed by the rate controller 228. The method 300 begins at step 302, where a next frame is selected as the current frame. At step 304, a determination is made whether the current frame is being encoded as an intra-frame (I-frame) or an inter-frame (e.g., a P or B frame). If the current frame is being encoded as an inter-frame, the method 300 proceeds to step 306. At step 306, the quantization parameter used by the quantizer 206 is adjusted by the rate controller 228 in accordance with an inter-adjustment algorithm. If the current frame is being encoded as an intra-frame, the method 300 proceeds from step 304 to step 308. At step 308, the quantization parameter used by the quantizer 206 is adjusted by the rate controller 228 in accordance with an intra-adjustment algorithm. Embodiments of inter-adjustment and intra-adjustment algorithms are described below. The method 300 returns to step 302 and repeats for each frame.

FIG. 4 is a flow diagram depicting an exemplary embodiment of a method 400 for encoding inter-coded video frames in accordance with one or more aspects of the invention. The method 400 may be performed during step 306 of the method 300 over multiple inter-frames. The method 400 begins at step 402, where a running average of motion vectors for each of a plurality of blocks is maintained over a threshold number of inter-coded frames. It is worth noting that we are actually interested in the apparent motion in a portion of the image (generally a macro-block) that occurs from one inter-coded frame to the next. The motion vectors for the macro-blocks typically refer back to the preceding I-frame or P-frame. Thus the motion of a portion of the image is represented by the change in motion vectors from one inter-coded frame to the next. Also, there are various methods of calculating a running average of motion vectors for inter-coded frames. One could average the change in motion vectors for specific macroblocks from one inter-coded frame to the next; or treat each motion vector as representing the total motion since the last I frame (since that is what it is referred to); or average the absolute values of the changes in motion vectors from one inter-coded frame to the next. There are still other methods of calculating a running average that are known in the art. In one embodiment, the video frames are formatted in accordance with QCIF, which is 176×144 pixels or 16 macroblocks by 9 macroblocks. The blocks at the perimeter of the frame will often be large, generally 16×16 pixels (e.g., macroblock). The blocks on the inner portion of the frame may be smaller (e.g., partitions of a macroblock). In one embodiment, a running average of motion vectors is maintained for each block in the frame. Alternatively, a running average of motion vectors may be maintained only for blocks on the perimeter of the frame. In any case, motion vector values for each selected block are obtained over multiple frames and an average value the motion vector is computed.

At step 404, the running average for each of the blocks is compared to a threshold value. The object of the threshold value is to differentiate unimportant, static background material, such as a door, from important moving portions of the image, such as a face. A face might move at the visually noticeable rate of one macroblock (16 pixels×16 pixels) per second. If there are 30 frames per second, then the threshold value for motion might be 0.5 pixels per second. At step 406, a quantization parameter is selected for each of the blocks based on the result of the comparison at step 404. For each of the blocks where the running average of the motion vector does not satisfy the threshold, a fine quantization parameter is selected. For each of the blocks where the running average of the motion vector does satisfy the threshold, a coarse quantization parameter is selected. In H.264, the value of the coarse quantization parameter is greater than the value of the fine quantization parameter. Thus, the image quality of the static background is allowed to degrade and be maintained at a preset level. In one embodiment, the decoder 114 may be configured to detect blocks quantized with the coarse quantization parameter. Upon detection of such, the decoder 114 may insert a white background in place of the coarsely quantized blocks. In any case, the image quality of the speaker will be preserved as high and processed normally by the decoder 114. The method 400 may be repeated over multiple sequences of inter-coded frames.

For the inter-coded frames, the blocks of the static background will likely have very little residual error. This follows the fact that, since the video capture device is static and the background is static, there is little motion in the background material. Also, the background is not likely changing. Therefore, the coefficients of the spatially transformed residual error will also be low. By setting the quantization step size to a larger value (coarse quantization parameter), the measured residual error may well be zero, which is acceptable for the less important, static background.

Figure 5:
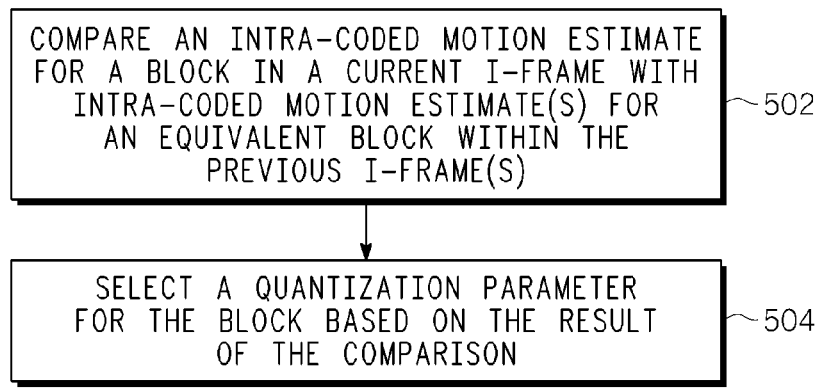
FIG. 5 is a flow diagram depicting an exemplary embodiment of a method for encoding intra-coded video frames in accordance with one or more aspects of the invention.

FIG. 5 is a flow diagram depicting an exemplary embodiment of a method 500 for encoding intra-coded video frames in accordance with one or more aspects of the invention. The method 500 may be performed during step 308 of the method 300. In the case of I-frames, motion compensation is done based on intra-prediction from other material within the same frame. However, it is still useful to use a larger quantization parameter for static background material in an I-frame. At step 502, an intra-coded motion estimate for a block in a current I-frame is compared with intra-coded motion estimate (s) for the equivalent block within previous I-frame(s). The intra-coded motion estimates are obtained from the motion compensator 220. At step 504, a quantization parameter is selected for the block based on the result of the comparison at step 502. If the background material is truly static, then the motion compensation vectors for that material, while non-zero, will be consistent from one I-frame to the next. In an I-frame the "motion compensation" vectors do not actually represent motion, but rather the displacement from the macroblock in question to a similar macroblock in the same frame, at the same time. If the intra-coded motion estimates are consistent (within a threshold of each other), then the quantization parameter is set to the coarse quantization parameter. Otherwise, the fine quantization parameter is used. The method 500 is repeated for each block in the I-frame. Alternatively, the method 500 may be repeated for only perimeter blocks of the I-frame.

Figure 6:
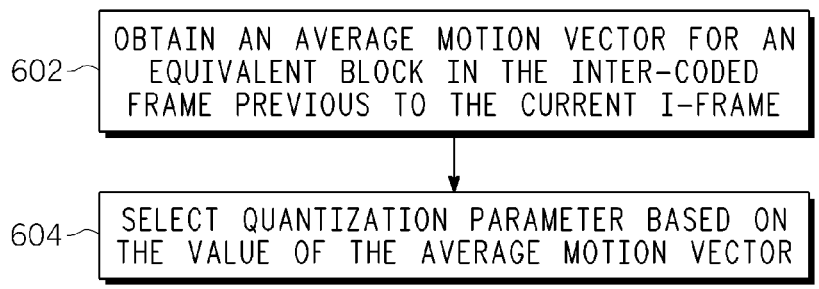
FIG. 6 is a flow diagram depicting another exemplary embodiment of a method for encoding intra-coded video frames in accordance with one or more aspects of the invention.

FIG. 6 is a flow diagram depicting another exemplary embodiment of a method 600 for encoding intra-coded video frames in accordance with one or more aspects of the invention. The method 600 may be performed during the step 308 of the method 300. The method 600 begins with a block in the current frame. At step 602, an average motion vector for an equivalent block in the inter-coded frame previous to the current I-frame is obtained. The average motion vector may be obtained as a result of execution of the method 400 during step 306 (e.g., shown as a dashed line in FIG. 3). In other words, one could use the same running average for the equivalent block in the inter-coded frame (preceding the current I frame) that was used to set the quantization level in that inter-coded frame. At step 604, a quantization parameter is selected for the block based on the value of the average motion vector. If the average motion vector of the equivalent block in the previous inter-frame satisfies a threshold (e.g., the same threshold used in the method 400), then the block in the I-frame is deemed static and the quantization parameter is set to the coarse quantization parameter. Otherwise, the quantization parameter is set to the fine quantization parameter. The method 600 is repeated for each block in the I-frame. Alternatively, the method 600 may be repeated for only perimeter blocks of the I-frame.

Occasionally, the static background material will undergo a sudden change and become non-static. This could result from a repositioning of the video capture device, for instance, or from turning on a light. In this case, the static background needs to be re-classified as important and the bandwidth savings feature needs to be deactivated. In one embodiment, the methods described above are performed. When the running average of the motion compensation vectors exceeds the threshold value, then the block is no longer considered static.

In another embodiment, at optional step 405 in the method 400, the running average for each of the blocks is compared to a previous running average from a previous sequence of frames. At step 406, the quantization parameter is further selected based on the result of the comparison at step 405. For each block where the running average of the motion vector is a threshold multiple of the previous running average, the quantization parameter is selected as the fine quantization parameter. That is, a sudden increase in the motion vector magnitude versus the previous running average would indicate a sudden, dynamic change in the background. Otherwise, the quantization parameter is selected based on the result of the step 404.

Figure 7:
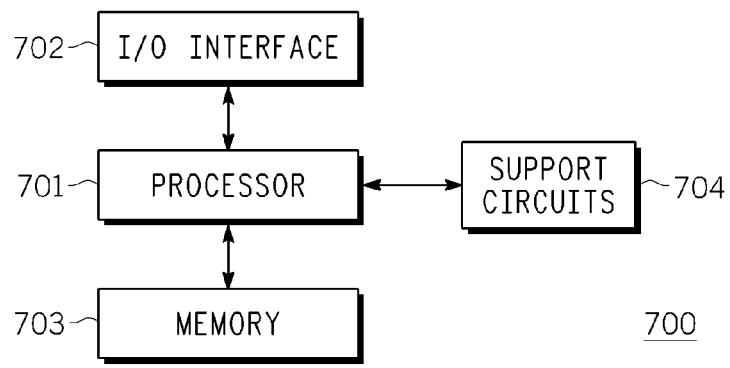
FIG. 7 is a block diagram depicting an exemplary embodiment of a rate controller in accordance with one or more aspects of the invention.

FIG. 7 is a block diagram depicting an exemplary embodiment of the rate controller 228 in accordance with one or more aspects of the invention. The rate controller 228 includes a processor 701, a memory 703, various support circuits 704, and an I/O interface 702. The processor 701 may be any type of processing element known in the art, such as a microcontroller, digital signal processor (DSP), instruction-set processor, dedicated processing logic, or the like. The support circuits 704 for the processor 701 include conventional clock circuits, data registers, I/O interfaces, and the like. The I/O interface 702 may be directly coupled to the memory 703 or coupled through the processor 701. The I/O interface 702 may be coupled to a frame buffer and a motion compensator, as well as to receive input frames. The memory 703 may include one or more of the following random access memory, read only memory, magneto-resistive read/write memory, optical read/write memory, cache memory, magnetic read/write memory, and the like, as well as signal-bearing media as described below.

In one embodiment, the memory 703 stores processor-executable instructions and/or data that may be executed by and/or used by the processor 701 as described further below. These processor-executable instructions may comprise hardware, firmware, software, and the like, or some combination thereof. The processor-executable instructions are configured to perform the methods 300, 400, 500, and 600 above. Although one or more aspects of the invention are disclosed as being implemented as a processor executing a software program, those skilled in the art will appreciate that the invention may be implemented in hardware, software, or a combination of hardware and software. Such implementations may include a number of processors independently executing various programs and dedicated hardware, such as ASICs.

An aspect of the invention is implemented as a program product for execution by a processor. Program(s) of the program product defines functions of embodiments and can be contained on a variety of signal-bearing media (computer readable media), which include, but are not limited to: (i) information permanently stored on non-writable storage media (e.g., read-only memory devices within a computer such as CD-ROM or DYD-ROM disks readable by a CD-ROM drive or a DYD drive); (ii) alterable information stored on writable storage media (e.g., floppy disks within a diskette drive or hard-disk drive or read/writable CD or read/writable DYD); or (iii) information conveyed to a computer by a communications medium, such as through a computer or telephone network. The latter embodiment specifically includes information downloaded from the Internet and other networks. Such signal-bearing media, when carrying computer-readable instructions that direct functions of the invention, represent embodiments of the invention.

While various embodiments have been described above, it should be understood that they are presented by way of example only, and not limiting. For example, although the invention disclosed herein was discussed in connection with two video telephones in the exemplary embodiments, one skilled in the art would recognize that the method and system disclosed herein can also be used in connection any type of communication device that can simultaneously transmit voice and video data. Thus, the breadth and scope of a preferred embodiment should not be limited by any of the above-described exemplary embodiments, but should be defined only in accordance with the following claims and their equivalents.

What is claimed is:

1. A method of encoding video in a video encoder having a processor and a memory, wherein the processor performs the method comprising:

maintaining in the memory a running average of motion vectors for each of a plurality of blocks over a threshold number of inter-coded frames in the video;

comparing the running average for each of the plurality blocks to a threshold value;

encoding each of the plurality of blocks the running average of which does not satisfy the threshold value using a first quantization parameter; and encoding each of the plurality of blocks the running average of which satisfies the threshold value using a second quantization parameter, the second quantization parameter resulting in a coarser quantization of transformed coefficients than the first quantization parameter.

2. The method of claim 1, wherein the plurality of blocks are located on a perimeter of each of the inter-coded frames.

3. The method of claim 1, further comprising:

comparing intra-coded motion estimates for blocks in an intra-coded frame in the video with intra-coded motion estimates for equivalent blocks in a previous intra-coded frame in the video; and encoding the blocks in the intra-coded frame using the second quantization parameter if the intra-coded motion estimates thereof are within a threshold of the intra-coded motion estimates for the equivalent blocks.

4. The method of claim 3, wherein the blocks in the intra-coded frame are located on a perimeter of the intra-coded frame.

5. The method of claim 1, further comprising:

encoding a block in an intra-coded frame using the second quantization parameter if the running average of a corresponding one of the plurality of blocks satisfies the threshold value.

6. The method of claim 5, wherein the block in the intra-coded frame is located on a perimeter of the intra-coded frame.

7. The method of claim 1, further comprising:

comparing the running average for each the plurality blocks with a previous running average for each of the plurality of blocks; and encoding each of the plurality of blocks the running average of which is a threshold multiple of the previous running average using the second quantization parameter.

8. Apparatus for encoding video, comprising:

means for maintaining a running average of motion vectors for each of a plurality of blocks over a threshold number of inter-coded frames in the video;

means for comparing the running average for each of the plurality of blocks to a threshold value;

means for encoding each of the plurality of blocks the running average of which does not satisfy the threshold value using a first quantization parameter; and means for encoding each of the plurality of blocks the running average of which satisfies the threshold value using a second quantization parameter, the second quantization parameter resulting in a coarser quantization of transformed coefficients than the first quantization parameter.

9. The apparatus of claim 8, wherein the plurality of blocks are located on a perimeter of each of the inter-coded frames.

10. The apparatus of claim 8, further comprising:

means for comparing intra-coded motion estimates for blocks in an intra-coded frame in the video with intra-coded motion estimates for equivalent blocks in a previous intra-coded frame in the video; and means for encoding the blocks in the intra-coded frame using the second quantization parameter if the intra-coded motion estimates thereof are within a threshold of the intra-coded motion estimates for the equivalent blocks.

11. The apparatus of claim 10, wherein the blocks in the intra-coded frame are located on a perimeter of the intra-coded frame.

12. The apparatus of claim 8, further comprising:
means for encoding a block in an intra-coded frame using the second quantization parameter if the running average of a corresponding one of the plurality of blocks satisfies the threshold value.

13. The apparatus of claim 12, wherein the block in the intra-coded frame is located on a perimeter of the intra-coded frame.

14. The apparatus of claim 8, further comprising:
means for comparing the running average for each the plurality blocks with a previous running average for each of the plurality of blocks; and
means for encoding each of the plurality of blocks the running average of which is a threshold multiple of the previous running average using the second quantization parameter.

15. A computer readable storage medium having instructions stored thereon that when executed by a processor cause the processor to perform a method of selecting a quantization parameter for encoding video, the stored instructions comprising steps for:
maintaining a running average of motion vectors for each of a plurality of blocks over a threshold number of inter-coded frames in the video;
comparing the running average for each of the plurality blocks to a threshold value;
selecting a first quantization parameter for each of the plurality of blocks the running average of which does not satisfy the threshold value; and
selecting a second quantization parameter for each of the plurality of blocks the running average of which satisfies the threshold value, the second quantization parameter resulting in a coarser quantization of transformed coefficients than the first quantization parameter.

16. The computer readable medium of claim 15, wherein the plurality of blocks are located on a perimeter of each of the inter-coded frames.

17. The computer readable medium of claim 15, further comprising:
comparing intra-coded motion estimates for blocks in an intra-coded frame in the video with intra-coded motion estimates for equivalent blocks in a previous intra-coded frame in the video; and
selecting the second quantization parameter for the blocks in the intra-coded frame if the intra-coded motion estimates thereof are within a threshold of the intra-coded motion estimates for the equivalent blocks.

18. The computer readable medium of claim 15, further comprising:
selecting the second quantization parameter for a block in an intra-coded frame using the second quantization parameter if the running average of a corresponding one of the plurality of blocks satisfies the threshold value.

19. The computer readable medium of claim 18, wherein the block in the intra-coded frame is located on a perimeter of the intra-coded frame.

20. The computer readable medium of claim 15, further comprising:
comparing the running average for each the plurality blocks with a previous running average for each of the plurality of blocks; and
selecting the second quantization parameter for each of the plurality of blocks the running average of which is a threshold multiple of the previous running average using the second quantization parameter.

* * * * *